United States Patent [19]
Ilie et al.

[11] Patent Number: 5,173,883
[45] Date of Patent: Dec. 22, 1992

[54] SNOOPER DEVICE FOR REGULATED PARKING TIME-ACCOUNTING SYSTEM

[75] Inventors: M. Francois Ilie; M. Alain Marechal, both of Paris, France

[73] Assignee: Hello SA, Paris, France

[21] Appl. No.: 805,112

[22] Filed: Dec. 10, 1991

[30] Foreign Application Priority Data

Dec. 20, 1990 [FR] France ................... 90 16254

[51] Int. Cl.⁵ .......................... G04F 1/00; G07C 1/30
[52] U.S. Cl. ...................... 368/90; 364/467; 235/378
[58] Field of Search .............. 368/90; 364/409, 467; 235/377-380

[56] References Cited

U.S. PATENT DOCUMENTS

| | | | |
|---|---|---|---|
| 4,310,890 | 1/1982 | Trehn et al. | 368/90 |
| 4,379,334 | 4/1983 | Feagins, Jr. | 364/467 |
| 4,460,965 | 7/1984 | Trehn et al. | 368/90 |
| 4,717,815 | 1/1988 | Tomer | 368/90 |
| 4,730,285 | 3/1988 | Lie | 368/90 |
| 4,847,776 | 7/1989 | Huang | 364/467 |
| 5,003,520 | 3/1991 | Grieu et al. | 368/90 |
| 5,029,094 | 7/1991 | Wong | 364/467 |

*Primary Examiner*—Vit W. Miska
*Attorney, Agent, or Firm*—Merchant & Gould, Smith, Edell, Welter & Schmidt

[57] ABSTRACT

A snooper device that can be used to memorize data elements relating to the most recent instances of parking, notably for proof in the event of disputes, in time-accounting devices, and notably time-accounting devices for reckoning periods of parking regulated by rules. This snooper device comprises first means to memorize operation checking data elements in which there are written, at each fresh use of the time-accounting system, data elements corresponding to the time and to the date of commencement of at least each instance of parking and data elements corresponding to the time and to the date of the end of this instance of parking.

10 Claims, 2 Drawing Sheets

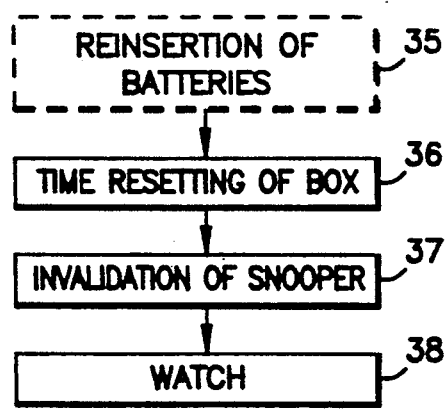
FIG. 3
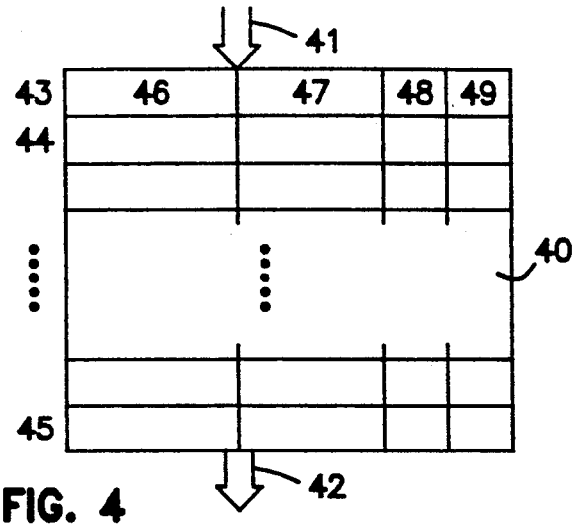
FIG. 4
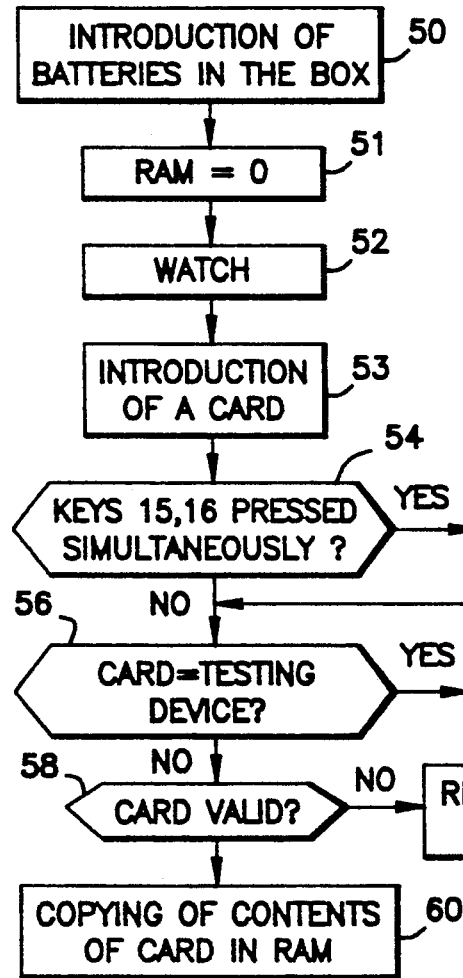
FIG. 5
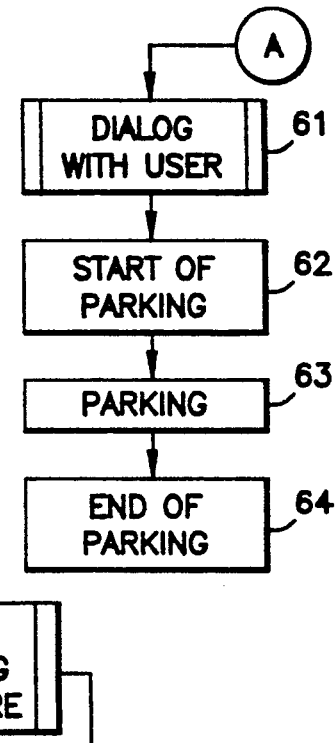

SNOOPER DEVICE FOR REGULATED PARKING TIME-ACCOUNTING SYSTEM

BACKGROUND OF THE INVENTION

1. Field of the Invention

The field of the invention is that of time-accounting devices, and notably that of time-accounting devices for reckoning periods of parking regulated by rules. More precisely, the present invention relates to a snooper device that can be used to memorize data elements relating to the most recent instances of parking, notably for proof in the event of disputes.

The term "time-accounting device" refers to an apparatus constituted, for example, by a box, preferably portable, that is designed to be placed behind the windscreen of a vehicle and works in cooperation with a prepaid electronic ticket, for example a memory card, to decrement fee units, memorized in the card, according to the parking time. This type of device can be used to eliminate the need for fixed individual posts (of the pavement parking meter type) or meters used in common (of the type found at the entrances to parking lots). The user automatically pays the parking fees by introducing a prepaid memory card into its box. The boxes are generally sold, loaned or given out on hire by local authorities or their agents who sell parking units in the form of cards of a different type for each local authority. The validity of the parking can be verified by means of a display device on which there appear the various elements of information needed by the checking staff, for example the number of the parking zone selected by the user, a code identifying notably the type of card introduced by the user into the box and representing the town or city in which the parking is being done and, as the case may be, an information element indicating a state of infringement of the rules, and the number of fee units still available in the card. The memories of the cards may be either rewritable or irreversibly written.

2. Description of the Prior Art

A device such as this is described, for example, in the French patent No. 87/06776 filed on behalf of the SOCIETE INTERNATIONAL POUR L'INNOVATION. The device described is a box comprising means to manage the changing of cards inserted into the box. The box also has an internal clock that can be used to give the current time (hour+minute) and the current date, and to make a regular countdown of the fee units and to take account of periods during the day when parking does not have to be paid for.

The validity of the parking is checked by an agent who ascertains notably, by means of the data displayed on the box, that the device has been truly turned on, that the card inserted really corresponds to the city or town in which the parking is being done, that the electronic circuitry of the box has not been damaged or spuriously made, that all the fee units available to pay for the parking have not been used up and that the maximum parking time permitted has not been exceeded. If the checker sees that one of the criteria is not met, then he is entitled to lay a charge against the owner of the offending vehicle.

However, in cases where the paid parking accounting device, in this instance the box, has a dysfunction that does implicate its owner, or when the official who has laid the charge does not properly appreciate the information given by the box, there is no way, at present, for the owner of the vehicle to prove that he has not commited any offence.

An object of the present invention, notably, is to overcome this drawback of the prior art.

SUMMARY OF THE INVENTION

More precisely, the main aim of the invention is to provide a device enabling a motorist charged with a parking offence to keep a record of his most recent instances of parking so as to be able to prove that he has not infringed the rules.

These aims, as well as others that shall appear hereinafter, are achieved by means of a time-accounting snooper device, notably for the reckoning of a period of regulated parking, said device comprising first means to memorize operation checking data elements in which there are written, at each fresh use of said system, data elements corresponding to the time and to the date of commencement of at least each last instance of parking and data elements corresponding to the time and to the date of the end of said instance of parking, said device including an independent integrated clock enabling it to generate information elements on the date, the counting of time and the instant of the current day, said information elements being capable of being updated by external action.

Advantageously, said first memorizing means also contain an operation checking data element, making it possible to verify whether the time resetting mechanism of said system has been activated since the end of said instance of parking.

Should each accounting system be formed by a box for the counting of the parking times, working in cooperation with different types of cards or elements containing consumable credit units through reading/writing means, then said means for memorizing the operation checking data elements preferably memorize the information element on the type of card used during said instance of parking.

Advantageously, said information element on the type of card is an information element identifying an area of validity of said card, notably a city or town.

Preferably, the device also includes means to memorize an information element on the parking zone that can be selected by the user from among several zones during the activation of said time-accounting system.

Advantageously, said first means for memorizing the operation checking data elements are constituted by a single memory compartment comprising data elements that correspond to the hour and date of the last instance of parking and/or a data element that can be used to check whether the time resetting mechanism of said device has been activated since said last instance of parking and/or a data element indicating the last city or town in which said device has been used.

According to another embodiment, said first means for memorizing the operation checking data elements are constituted by a FIFO type table containing at least two memory compartments enabling the memorizing of data elements corresponding at last to the least two instances of parking, each memory compartment comprising data elements corresponding to the time and date of start and end of at least the last instance of parking and/or a data element making it possible to verify whether the time resetting mechanism of said device has been activated between the corresponding instant of the end of parking and the instant of the commencement of the next parking and/or a data element indicating the city or town in which said device has been used.

Advantageously, said first memorizing means are constituted by a programmable read-only memory of the PROM, EPROM or EEPROM type.

Preferably, said information elements on the parking area and/or parking zone are stored in RAM-type second temporary storage means.

According to an advantageous embodiment, said second memorizing means are re-intialized by an external updating of the hour and/or the date and/or by an interruption of the supply to said device.

Preferably, the device according to the invention includes means to supply said operation checking data elements to an external testing device.

BRIEF DESCRIPTION OF THE DRAWINGS

Other features and advantages of the invention shall appear from the following description of a preferred embodiment of the invention, given by way of a non-restrictive illustration, and from the appended drawings, of which:

FIG. 3 is a flow chart representing the operation of the invalidation of the device according to the invention;

FIG. 4 shows the organization of the means for memorizing the operation checking data elements according to an advantageous embodiment of the present invention;

FIG. 5 is a flow chart illustrating the operation of the invention after its supply has been restored.

DETAILED DESCRIPTION OF THE INVENTION

Figure 1:
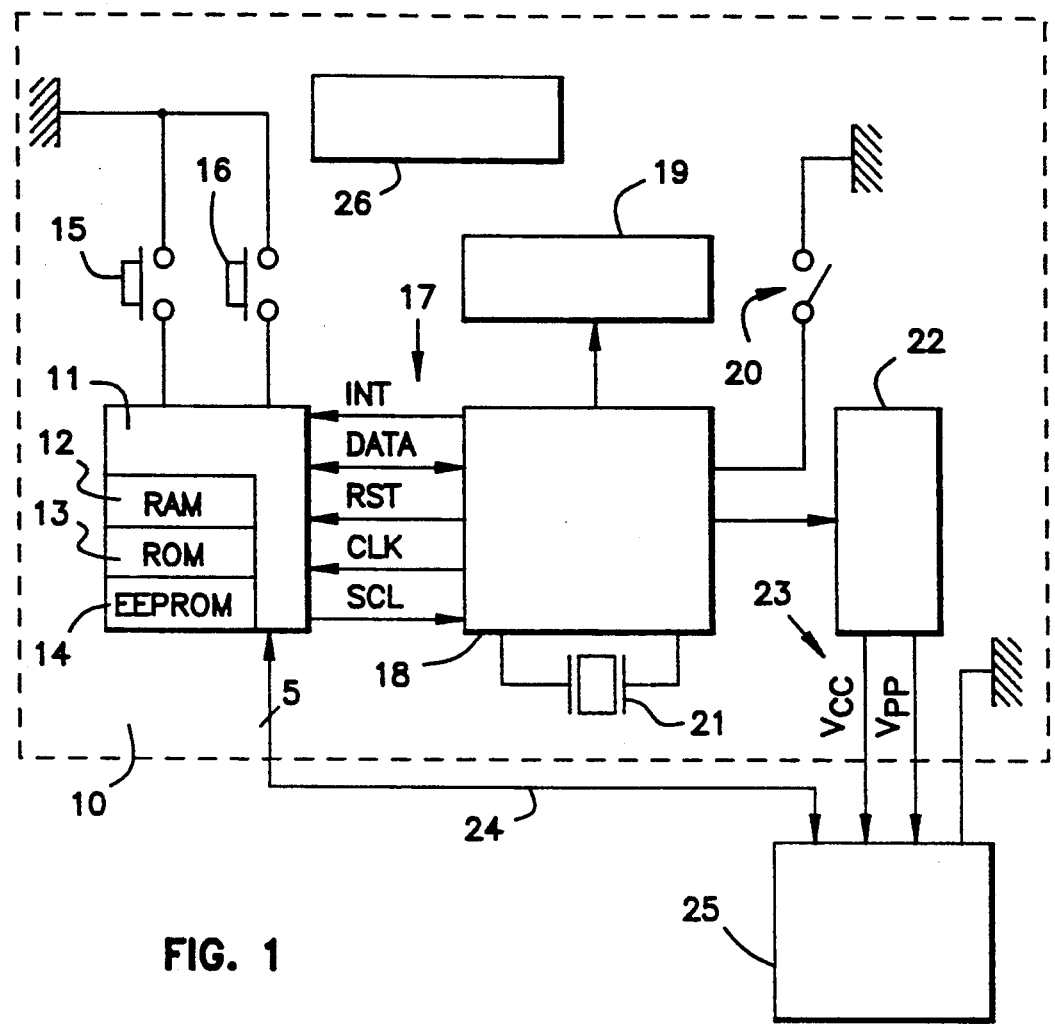
FIG. 1 is a schematic diagram of a preferred embodiment of the device according to the present invention.

FIG. 1 is a schematic diagram of a preferred embodiment of the device according to the present invention.

The snooper device according to the present invention uses an electronic system 10, preferably fitted into a portable box cooperating with an element 25 containing consumable credit units. The electronic system 10 includes a microcontroller 11 with an integrated RAM 12, a ROM 13 and an electrically erasable permanant ROM 14. The microcontroller 14 is, for example, a circuit of the MOTOROLA 6805 (registered name) group. The RAM 12 is used to memorize the computation parameters during the operation of the device, the ROM 13 to memorize computation algorithm type confidential data and the EEPROM 14 to memorize notably data elements that may be used for a check, if necessary, of the efficient operation of the device as shall be explained hereinafter. The EEPROM 14 may also memorize data used to modify the oscillation frequency of a quartz element 21, define instructed values for the generation of specific voltages (for the supply of the element 25) or data relating to a secret key. The EEPROM 14, according to a specific embodiment, has a size of 256 bytes. The microcircuit 11 interfaces with an application specific integrated circuit (ASIC) through five lines 17. The ASIC 18 is, for example, of the FULL CUSTOM type. The line INT sends the microcontroller 11 an interruption information element corresponding to the insertion or removal of the element 25 into or from the element 25 in the device 10 (the activation of the microcontroller). Furthermore, an interruption is generated every minute, the time unit being one minute, and when the element 25 activates the limit switch 20 of the element 25 in the box. The two lines DATA and SCL convey the information elements exchanged between the two circuits. The line RST is a line for resetting the initial state of the microcontroller 11 and the line CLK conveys the clock signal for the microcontroller 11. Furthermore, the ASIC is fitted out with a real-time clock driven by the quartz element 21 connected to the ASIC 18. The quartz element oscillates advantageously at 32 kHz. The ASIC 18 also manages display means 19, for example means constituted by a liquid crystal display screen. The screen 19 notably enables the display of the current time (hour and minutes), the allowed parking time limit, the number of payment credit units available on the element 25 and the parking zone. The parking zone may be modified by the user by the activation of keys 15 and 16 placed preferably on top of the box enclosing the electronic circuitry 10. The choice of one parking zone rather than another modifies the number of consumable units debited from the element 25 and hence provides for matching the payment system with different zones having different hourly parking tariffs. According to one embodiment, the user has the choice between different zones displayed in the form of hexadecimal figures.

The ASIC 18 gives a supply to a voltage-raising module 22 giving a voltage Vcc and a voltage Vpp to the element 25, necessary for its operation. The supply of the complete system is provided by supply means 26 which are advantageously constituted by a set of batteries so that the box can be portable. The voltages 23 are given to the element 25 in relation to a common ground. Five communications lines 24 connect the microcontroller 11 to the element 25. The element 25 advantageously takes the form of a credit card and includes an input-output port and a PROM type memory memorizing a number of fee units that are preferably consumable in an irreversible manner.

The keys 15 and 16 enable the user to set the current time and date by simultaneously pressing the two keys 15 and 16 when he inserts a card 25 into the box to activate an updating of the time and date. The screen 19 then makes a successive display, at 4-second intervals, of the year, then the month, then the day of the week and day of the month, and then the hour and finally the minutes. It is then enough to press one of the two keys 15 and 16 to increment and decrement the data element displayed. The device may advantageously take account of the changing to winter time and summer time.

Figure 2:
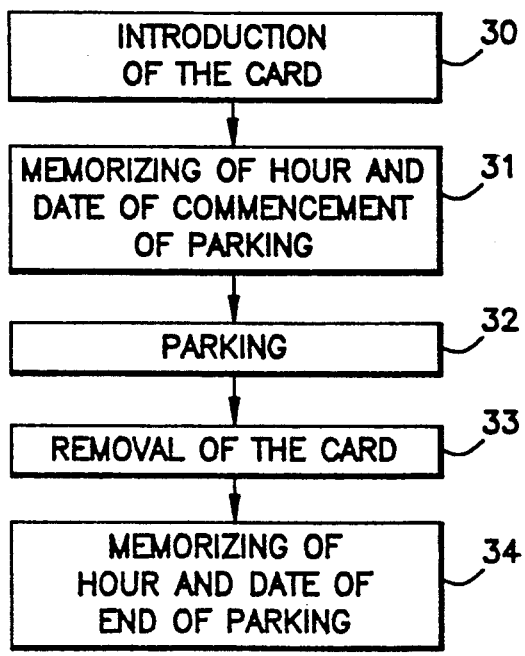
FIG. 2 is a flow chart illustrating the principle of memorization of data elements enabling a subsequent checking of the operation of the device according to the invention.

FIG. 2 is a flow chart illustrating the principle of memorization of data enabling a subsequent check of the operation of the device according to the invention.

The usual procedure followed by the user of a box according to the invention consists in introducing a payment card into the box before he leaves his vehicle. The display unit 19 (FIG. 1) then repectively displays the current time, the credit of available units memorized in the card 25, and then alternately and several times in succession the zone number, the date and the parking time limit. The parking zone in which the vehicle is located is chosen, as already specified, by means of the keys 15 and 16. The step 30 corresponds to this sequence of displays on the screen 19. At the end of several tens of seconds, the first fee unit is deducted from the memory of the card and the exact time (to within the nearest minute) and the date are memorized in the EEPROM 14 of the microcontroller 11. This memorization corresponds to the step 31 and lasts some ms. The step 32 is that of the parking itself, and consists in the cyclical display of the current time, the zone number, the parking commencement time and a code representing the area of validity of parking. This code is, for example, the result of the secret computation as described in the joint patent application filed on behalf of the present applicant and entitled: "Time-Accounting System and Device Comprising Means for the Generation of Codes at Instants Computed by a Secret Algorithm". This computation notably makes use of a code of the area of validity of the card inserted into the box which may correspond, for example, to a city or town code when the cards are commercially distributed by a municipality. For, each city or town has its own cards that it sells to users, each card having the same number and the city or town numbers being different from one another. The city or town code therefore corresponds to a certain type of card. The fee units are decremented from the card according to the time spent and the zone selected. The step 33 corresponds to the return of the owner of the vehicle who removes the card 25 from the box to stop the counting of the units. After this card has been removed, the step 34 consists in memorizing the end-of-parking time and the current day in the EEPROM 14. At this particular instant, it is also possible to memorize the number of the town or city in the EEPROM 14 by the reading of the RAM 14. The snooper of the invention is then valid, i.e. the EEPROM memorizes, at the same time, at least the times and the date or dates of the commencement and ending of the parking with the parking area code.

If, for any reason, the motorist should be charged with an offence by an official, and if he considers the charge to be unwarranted, he can take his box to a control center, for example a police station where there is a testing device. Using specific reading/writing means or else, more simply, using the reading/writing means of the box which also serve for the card, the testing device may enter into communication with the EEPROM 14 to find out whether the motorist was within his rights or not when the charge was laid against him. This check is simple to make since the memorized data elements relate to temporal data elements on the beginning and end of parking. The testing device may be constituted, for example, by a case connected to an element that has the same shape as a card and is capable of sliding into the box enclosing the snooper of the invention to engage in dialog with it.

If, on the contrary, the motorist considers the charge against him to be warranted, he may continue to use his parking time-accounting system, the former operation checking data elements memorized in the EEPROM 14 being replaced by those resulting from a new instance of parking.

This snooper principle makes it possible, however, to prevent unjustified penalties. It must be pointed out that it can also be applied when it is impossible for the user himself to set the current time and date of his box.

However it can happen that a user who has actually committed a parking offence will try to cheat by forcing the snooper, as described here above, to memorize the date and time span for which he has been charged with an offence so as to make it seem that his box has been debiting parking units during this very time. All that he needs to do, for this purpose, is to modify the time and, if necessary, the date of the box so as to position it approximately in this period for which he has been charged. He could then introduce a card into the device to make it debit units, for example at home, and thus prompt a memorizing, in the snooper, of a parking commencement time and date prior to the period for which he has been charged with the offence, and the memorizing, in this snooper, of a time and date after this period for which he has been charged with the offence. Since the time and date of the alleged offence would then be between these two memorized instants, he could claim to have committed no offence, and the testing device would be incapable of detecting any fraud.

To prevent the possibility of this kind of scheme, there is proposed the recording, by the snooper according to the invention, of a data element in the EEPROM of the microcontroller, said data element indicating whether the time resetting mechanism has been activated since the last instance of regulated parking. This data element may be constituted, for example, by a byte 00H if a time resetting has been done and FFH if no time resetting has been done (since the last instance of parking). The EEPROM 14 thus notably contains the following data elements:

-1 byte indicating whether the time resetting mechanism has been activated;

-3 bytes determining the date (year, month and day) and the instant (exact hour and minutes) of the start of the last parking;

-3 bytes determining the date (year, month and day) and the instant (exact hour and minutes) of the end of the last parking.

These seven bytes can be read by the testing device which sends an identification message to the microcontroller 11 to obtain permission to read this content of the EEPROM 14.

The EEPROM 14 may also include an additional memory space for the memorizing, for example on two bytes, of the code of the city or town in which the last parking has taken place and, on one byte, the zone in which the last parking has taken place.

FIG. 3 is a flow chart representing the operation of an invalidation such as this.

The invalidation may notably result from a removal of the batteries that provide the supply 26 to the system. Indeed, it is necessary to provide for an invalidation in this case for the snooper is no longer capable of recording any data element in the EEPROM 14 if its supply is removed. An interruption in supply such as this does not however destroy the data memorized in the EEPROM 14. After the batteries have put back (step 35), the snooper according to the invention obliges the user to carry out a time resetting operation (36) on the box. This time resetting operation prompts an invalidation of the snooper (step 37) through the replacement of the FFH by 00H of the data element enabling the detection of a time-setting operation. The snooper is then in a watching state (step 38). The byte that makes it possible to know whether a time-setting operation has been done is erased at the next end of parking.

According to an advantageous embodiment of the invention, the EEPROM 14 memorizes the operation checking data elements for a plurality of instances of parking using the system of the invention. The memorizing means then work in the same way as a FIFO type stack. In the case of the present application of the snooper, a memory comprising data elements of the last eight instances of parking appears to be sufficient to provide for greater facility in the use of the system. For, when a motorist is charged with an offence, and when he considers this charge to be unjustified, he cannot use his box again before having it checked by the testing device. Otherwise, the data elements relating to his previous parking would be erased and he would no longer be able to prove that he had committed no offence.

FIG. 4 shows the organization of the means for memorizing operation checking data elements according to an advantageous embodiment of the invention.

The memorizing means may be constituted by a table 40, for example of the FIFO type. The operation checking data elements are entered into the table 41 and memorized in memory zones 43 to 45. These memory zones are, for example, eight in number to enable the memorizing of the last eight instances of parking. Each sequence of memorized data elements is constituted by the date and time 46, on three bytes, of the commencement of an instance of parking, the date and time 47, on three bytes, of the end of this parking, a byte 48 indicating whether a time resetting operation has been done after the end of this parking and, possibly, two bytes 49 comprising the code of the city or town in which this parking has been done. When a new sequence of data elements has to be memorized, the data elements already memorized undergo a shift towards the bottom of the table 40. When the table 40 is full, the memorizing of a new sequence of data elements prompts the loss of the oldest sequence which leaves the table by 42.

A memory organization such as this enables a motorists who feels that he has been unjustly charged with an offence to continue to use his box for a certain number of parkings, while retaining the possibility of proving that he was in the right.

According to another characteristic of the invention, data elements relating to the city or tariff zone in which the last parking occurred are recorded at the end of parking in the temporary RAM 12 (FIG. 1). This characteristic is seen in the flow chart of FIG. 5 also illustrating the working of the snooper of the invention after the power supply to the device has been restored.

The step 50 corresponds to the insertion of batteries into the box containing the snooper. This insertion prompts (step 51) a zero-setting of the contents of the RAM 12. The step 52 is a step of waiting for a card insertion during which the device is in a watching state. When a card is inserted (step 53), the device checks to see whether the two keys 15 and 16 have been pressed simultaneously. If this is the case, a procedure enabling a time resetting operation, as described here above, is launched (step 55). When the time resetting is over or if both keys 15 and 16 have not been pressed, the device checks to see whether the element inserted, in this case a card, is the testing device (step 56); the testing device engages in dialog with the box to identify itself. If the response is yes, the step 57 corresponds to the reading of the operation checking data elements memorized in the EEPROM 14 and ends with the withdrawal of the testing device or of the element providing the interface between the testing device and the box. If the element introduced into the box is not the testing device, the validity of the card is tested (step 58) and leads to a request for withdrawal (step 59) that appears on the display means 19 if the box does not recognize the card. If the card is recognized, its contents are copied into the RAM 12 (step 60) so as to reduce the memory requirement to the minimum.

The contents of the card include notably the code of the city that has issued it, the zones accompanied by the description of the times and tariffs applicable to its use, various codes and data elements, and the number of fee units. The step 61 consists in setting up a dialog with the user so that he can define notably the zone in which he is parked and in memorizing the selections made. A memorization is also done of the display made, the type of card used, various temporary variables and the parking commencement time enabling the computation of the time at which the permitted parking will end. The step 62 marks the beginning of the parking and consists in memorizing the selected zone number in the RAM 12. The step 63 corresponds to the effective parking of the vehicle during which the ASIC 18 activates the microcontroller 11 every minute so that it manages the fee unts memorized in the RAM 12 and in the element 25 and simultaneously manages the display 19. The step 64 corresponds the end of parking when the owner of the vehicle will remove the card from the box. The city number is then memorized in the EEPROM 14.

The city and zone numbers remain memorized in the RAM 12 until new city and zone numbers replace them or until there is a cut in the power supply.

The memorizing of the city number in the EEPROM 14 enables subsequent checking, by means of the testing device, to see if the card used to pay for the parking was a card issued by the city in which the charge was laid against the user and not a card issued by another city.

It must be noted that it is also possible to memorize the parking zones in an EEPROM table 14 in order to have a larger quantity of information available on occurrences of parking.

What is claimed is:

1. A snooper device for a time-accounting system, notably for the reckoning of a period of regulated parking, said device comprising an autonomous integrated clock enabling it to generate information elements on the date, the counting of time and the instant of the current day, said information elements being capable of being updated by external action, wherein said device comprises first means to memorize operation checking data elements in which there are written, at each fresh use of said system, data elements corresponding to the time and to the date of commencement of at least each last instance of parking and data elements corresponding to the time and to the date of the end of said instance of parking, said first memorizing means also containing an operation checking data element, making it possible to verify whether the time resetting mechanism of said system has been activated since the end of said instance of parking.

2. A device according to claim 1, wherein each accounting system is formed by a box for the counting of the parking times, working in cooperation with different types of cards or elements containing consumable credit units through reading/writing means, wherein said means for memorizing the operation checking data elements preferably memorize the information element on the type of card used during said instance of parking.

3. A device according to claim 2, wherein said information element on the type of card is an information element identifying an area of validity of said card, notably a city or town.

4. A device according to claim 2, also including means to memorize an information element on the parking zone that can be selected by the user from among several zones during the activation of said time-accounting system.

5. A device according to claim 1, wherein said first means for memorizing the operation checking data elements are constituted by a single memory compartment comprising data elements that correspond to the hour and date of the last instance of parking and/or a data element that can be used to check whether the time resetting mechanism of said device has been activated since said last instance of parking and/or a data element indicating the last city or town in which said device has been used.

6. A device according to claim 1, wherein said first means for memorizing the operation checking data elements are constituted by a FIFO type table containing at least two memory compartments enabling the memorizing of data elements corresponding at least to the last two instances of parking, each memory compartment comprising data elements corresponding to the time and date of start and end of at least the last instance of parking and/or a data element making it possible to verify whether the time resetting mechanism of said device has been activated between the corresponding instant of the end of parking and the instant of the commencement of the next parking and/or a data element indicating the city or town in which said device has been used.

7. A device according to claim 1, wherein said first memorizing means are constituted by a permanent read-only memory of the PROM, EPROM or EEPROM type.

8. A device according to claim 2, wherein said information elements on the parking area and/or parking zone are stored in RAM-type second temporary storage means.

9. A device according to claim 8, wherein said second memorizing means are re-initialized by an external updating of the hour and/or the date and/or by an interruption of the supply to said device.

10. A device according to claim 1, including means to supply said operation checking data elements to an external testing device.

* * * * *